United States Patent [19]

Kaish

[11] Patent Number: 4,494,114
[45] Date of Patent: Jan. 15, 1985

[54] SECURITY ARRANGEMENT FOR AND METHOD OF RENDERING MICROPROCESSOR-CONTROLLED ELECTRONIC EQUIPMENT INOPERATIVE AFTER OCCURRENCE OF DISABLING EVENT

[75] Inventor: Norman Kaish, Whitestone, N.Y.

[73] Assignee: International Electronic Technology Corp., Far Rockaway, N.Y.

[21] Appl. No.: 558,115

[22] Filed: Dec. 5, 1983

[51] Int. Cl.³ .......................... G08B 13/06; G06F 7/00
[52] U.S. Cl. .................................. 340/825.31; 340/63; 340/571; 364/900
[58] Field of Search .............................. 235/382, 382.5; 364/200, 900, 184, 709; 340/63, 64, 65, 517, 568, 825.31, 825.32, 825.33, 825.34, 543, 571, 652, 673

[56] References Cited

U.S. PATENT DOCUMENTS

| | | | |
|---|---|---|---|
| 2,843,843 | 7/1958 | Davis | 123/146.5 B |
| 3,656,114 | 4/1972 | Hesselgren | 340/825.32 |
| 3,815,088 | 6/1974 | Kumpfbeck et al. | 340/63 |
| 4,090,089 | 5/1978 | Morello | 340/825.32 |
| 4,103,289 | 7/1978 | Kolber | 340/825.32 |
| 4,262,337 | 4/1981 | Jones | 364/709 |
| 4,267,578 | 5/1981 | Vetter | 364/709 |
| 4,283,710 | 8/1981 | Genest et al. | 235/382.5 |
| 4,284,983 | 8/1981 | Lent | 340/568 |
| 4,437,153 | 3/1984 | Kamiyama et al. | 364/184 |
| 4,438,431 | 3/1984 | Toyomura | 364/709 |

OTHER PUBLICATIONS

Nakamichi Mobile Sound System, TD-1200/PA-300/SP-400.

Primary Examiner—Gareth D. Shaw
Assistant Examiner—Daniel K. Dorsey
Attorney, Agent, or Firm—Kirschstein, Kirschstein, Ottinger & Israel

[57] ABSTRACT

A lock-out security arrangement for and method of maintaining microprocessor-controlled electronic equipment normally operational until the occurrence of a disabling event, such as physical removal of the equipment from its normal installation, and/or electrical removal of the equipment from a source of electrical power, and thereupon for disabling the equipment after detecting the disabling event and for maintaining the equipment disabled, even after the disabling event has been discontinued, until a code manually entered via a keyboard associated with a microprocessor for controlling the normal operation of the equipment matches a private access code whose identity is protected from external interrogation by reason of being stored in an internal non-volatile memory of the microprocessor. The private access code is preferably selected by and known only to the user, and may be changed to a different private access code at the user's option.

31 Claims, 4 Drawing Figures 4,494,114

SECURITY ARRANGEMENT FOR AND METHOD OF RENDERING MICROPROCESSOR-CONTROLLED ELECTRONIC EQUIPMENT INOPERATIVE AFTER OCCURRENCE OF DISABLING EVENT

BACKGROUND OF THE INVENTION

1. Field of the Invention

The present invention generally relates to a security arrangement for and method of maintaining microprocessor-controlled electronic equipment normally operational until the occurrence of a disabling event, and thereupon for rendering the electronic equipment inoperative after the occurrence of the disabling event, as well as for maintaining the electronic equipment inoperative even after the disabling event has been terminated until a private code is entered to the microprocessor which controls the operation of the equipment.

2. Description of the Prior Art

There have been various proposals as to how to secure electronic equipment against theft. In the case of electronic equipment of the type controlled by a microprocessor manually accessed by a keyboard, it has been proposed, for example, in U.S. Pat. No. 4,103,289, in connection with an electronic calculator, to provide an electronic lock within the calculator which permits operation only after the operator has correctly operated a predetermined sequence of keys which constitutes the code. Prior to using the calculator for its normal calculating function, the code must be entered via the keyboard. The code is built into the memory of the microprocessor and is part of the internal silicon structure of the microprocessor chip. The built-in code is the same for each microprocessor in a production run, and is mass-produced along with the rest of the microprocessor.

Although generally satisfactory for its intended purpose, the above-described electronic calculator lock has proven to be inefficient and inconvenient to use. Since the code is built into the microprocessor chip, each and every calculator has the same fixed access code. This means that the access code would quickly become publicly known. Also, the fixed access code cannot be changed, and certainly not by the user. At best, the only way to change the fixed code would be for the integrated circuit manufacturer to design and build a different microprocessor with its own fixed code. It would, of course, be prohibitively expensive for the manufacturer to design and build a different custom-made microprocessor for each and every piece of electronic equipment to be protected.

Furthermore, it is objectionable to many users of electronic equipment to be compelled to unlock the equipment each and every time the equipment is to be used. For example, if the electronic equipment is a device having a keyboard and is to be operated on an intermittent basis, a user may not wish to be bothered with repeatedly having to unlock the equipment by manually entering the code prior to each use.

Another recent proposal in connection with theft-proofing automobile radios was made by Nakamichi U.S.A. Corporation in its commercial brochure entitled "Nakamichi Mobile Sound System" for use with its mobile tuner/cassette deck Model TD-1200. This car radio uses a built-in microprocessor and a set of push-buttons which act as a manual keyboard. A separate PROM (Programmable Read Only Memory) is connected to the microprocessor. Each PROM is electronically programmed at the factory with a different access code for each radio produced. The owner is provided with a tag imprinted with his unique access code. In use, each time before the radio can be turned on, the access code must be entered via the radio push-buttons.

The Nakamichi radio is made theft-proof by what is essentially an electronic lock which, although generally satisfactory for its intended purpose, has not proven to be altogether reliable in preventing theft. For example, the Nakamichi lock can be compromised in at least two ways. The contents of the separate PROM of a stolen radio can be interrogated by readily available electronic equipment and the access code can be easily deduced. The stolen radio can then be re-sold since the new owner will be provided with the correct code.

A second technique of compromising the Nakamichi lock is even simpler. A single Nakamichi radio can be purchased through a valid retail outlet. The radio would then be opened and the separate PROM removed and its contents interrogated as before. Duplicate PROMs can then be manufactured in any quantity desired. The code they represent is known from the tag originally provided. Thus, any stolen Nakamichi radios can be re-sold by replacing the original PROM with the duplicate clone PROM and providing the new owner with the known code.

In addition, the Nakamichi lock is like every other lock in the sense that the access code must be entered prior to each use of the equipment. Many users may not wish to be bothered by being repeatedly compelled to unlock the equipment and, hence, are prone to leaving the equipment unlocked at all times, thereby defeating the theft-proofing function.

It must also be noted that the Nakamichi lock is provided with a fixed, unchangeable code which has been selected by the factory. If the user forgets the code, then the user must contact the factory for the code. It would be desirable if the private code could be selected by the user to be a code that is easily remembered by him, e.g. his telephone number or social security number. This would minimize the problem of a forgetful memory. It would further be desirable if the user could himself change the code from time to time to any other code in order to increase the system security.

Aside from the electronic locks described above, additional anti-theft locks are described in U.S. Pat. Nos. 2,843,843; 3,656,114 and 4,090,089. Each lock requires a code to be entered in a proper predetermined order prior to using the equipment normally locked thereby.

It has further been proposed in U.S. Pat. No. 4,284,983 to protect an electrical appliance from theft and unauthorized movement by the setting of an alarm when the appliance is both disconnected and moved. In U.S. Pat. No. 3,815,088 an alarm is set off when an unauthorized entry is made into a vehicle. These alarms can both be easily by-passed, in which case, the item being protected is once again usable for its normal purpose.

SUMMARY OF THE INVENTION

1. Objects of the Invention

Accordingly, it is a general object of the present invention to overcome the aforementioned drawbacks of the prior art.

It is a further object of the present invention to secure microprocessor-controlled electronic equipment against theft by rendering the stolen equipment essentially valueless to the thief.

It is an additional object of the present invention to reliably maintain microprocessor-controlled electronic equipment normally operational until the occurrence of a disabling event, to reliably render the equipment inoperative after the occurrence of the disabling event, and to reliably maintain the equipment inoperative, even after the disabling event has been terminated, until a private access code is entered to the microprocessor which controls the operation of the equipment.

It is yet a further object of the present invention to protect the private access code stored in a microprocessor from external interrogation, both visual and electronic.

Still another object of this invention is to allow a user to conveniently select his own private code.

An additional object of this invention is to allow a user to easily change the private access code to another.

Still another object of the present invention is to avoid the necessity of compelling a user to enter a private access code prior to each and every usage of the equipment.

A further object of the present invention is to provide absolute code security which is immune to tampering techniques.

It is additionally an object of the present invention to provide a user with a wide choice of codes of which the user may select any one which ensures ease of memorization.

Yet another object of the present invention is to eliminate any factory record of codes that could be compromised by a security breach in the factory.

A still further object of the present invention is to severely restrict the problem of guessing the identity of the private access code by trial-and-error techniques to a minimal percentage by devising a code of increased complexity and by introducing lengthy time delays between attempted code entries.

An additional object of the present invention is to provide a custom-made security arrangement whose private access code is known only to the user.

Another object of the present invention is to provide a reliable security arrangement which is simple in construction and inexpensive to manufacture.

2. Brief Description of the Invention

In keeping with these objects and others which will become apparent hereinafter, one object of the invention resides, briefly stated, in a security arrangement for, and method of, rendering electronic equipment, e.g. an automobile radio, a television set, a video cassette recorder, a computer terminal, a stereo system, an office typewriter, etc., inoperative after the occurrence of a disabling event, for example, a theft event wherein the equipment is removed from its normal authorized operating location or from its source of electrical power.

The invention comprises a programmed microprocessor, preferably a single integrated circuit chip, operative for executing a program having an operational routine for controlling the normal operation of the equipment, and a security routine for controlling the security of the equipment. The microprocessor has an internal non-volatile memory, e.g. a read/write random access memory (RAM) with a battery back-up circuit, or an electrically erasable programmable read only memory (EEPROM) accessed solely from within and protected from external interrogation, both physical and electronic.

The microprocessor is programmed for distinguishing between a complete initial execution of the program and a subsequent execution thereof. In addition, the invention includes initialization means operatively associated with the microprocessor for conditioning the latter during the initial program execution to accept a code for storage, and to store the code in the protected memory of the microprocessor. The code may either be a public code common to all equipment of a given model or production run, or may be a private code known to and selected by the factory.

The microprocessor can be conditioned to accept the public or private code in several ways. For example, factory programming equipment may be used to apply an identical factory code signal to each microprocessor in a given model or production run in order to condition each microprocessor to accept and temporarily store a common public code in the protected microprocessor memory. Alternatively, the factory programming equipment may be used to apply a different factory code signal to each microprocessor in a given model or production run in order to condition each microprocessor to accept and store a different private code.

In still another approach, the microprocessor is programmed to permanently load a flag in a predetermined location in the protected memory after the initial program execution. When the flag is not present in the predetermined memory location, the microprocessor is conditioned to accept and to temporarily store a common public code in the protected microprocessor memory.

In still another approach, a code entry means, for example a manual entry keyboard, is operative to enter a code to the microprocessor. In this approach, the microprocessor is programmed with a code entry routine which is erased after the initial program execution. Before erasure, the microprocessor is conditioned to accept and to temporarily store a common public code.

In further accordance with this invention, the microprocessor is programmed to enable it to execute the operational routine after a private code has been stored in the protected memory of the microprocessor, and to maintain the equipment normally operational until the occurrence of the aforementioned disabling event. The private code may have been directly entered by the aforementioned factory programming equipment which utilized different factory code signals.

Alternatively, in each of the above mentioned cases where a public code was stored in the protected memory, a code entry means, e.g. a manual entry keyboard, is used to change and enter a unique private access code whose identity is selected by and known only to the user.

The invention yet further includes detector means, e.g. a power interrupt detector and/or a position detector operatively associated with the microprocessor for detecting the occurrence of the disabling event; and disabling means also operatively associated with the microprocessor for causing the same to execute the security routine after the detection of the disabling event in order to disable the equipment from normal operation.

The microprocessor is programmed to compare a code entered by the keyboard during the subsequent program execution, as determined by the distinguishing means, to the stored private code whose identity is protected from external interrogation. The disabling means is further operative for maintaining the equipment disabled, even after the disabling event has been terminated, until the code entered during the subsequent program execution matches the stored private code.

In accordance with an advantageous aspect of this invention, the private code is unique for each microprocessor, is known only by the user, and is stored in an internal nonvolatile memory of the microprocessor so that it is protected from external interrogation by even sophisticated electronic equipment. This is in contrast to previously tried approaches where different private codes were stored in PROMs but were easily interrogated to reveal their stored codes, and where duplicate PROMs were easily manufactured and substituted for the original ones. This is also in contrast to prior art proposals where only the same fixed code was stored in each microprocessor, an approach which was easily defeated once the code was obtained for any one microprocessor.

The stolen equipment, in accordance with this invention, is essentially valueless to the thief because the equipment will remain inoperative unless the private code is entered to the microprocessor. Inasmuch as the private code is just that, i.e. secret and selected by and known only to the user, there is no way for the thief to obtain the code. To ensure added code privacy, the user can change the private code at will to any other private code. Any attempt to enter the code by trial-and-error techniques is thwarted by introducing a lengthy time delay between code entry attempts.

The novel features which are considered as characteristic of the invention are set forth in particular in the appended claims. The device itself, however, both as to its construction and its mode of operation, together with additional features and advantages thereof, will best be understood upon perusal of the following detailed description of certain specific embodiments with reference to the accompanying drawings.

DETAILED DESCRIPTION OF THE PREFERRED EMBODIMENTS

Figure 1:
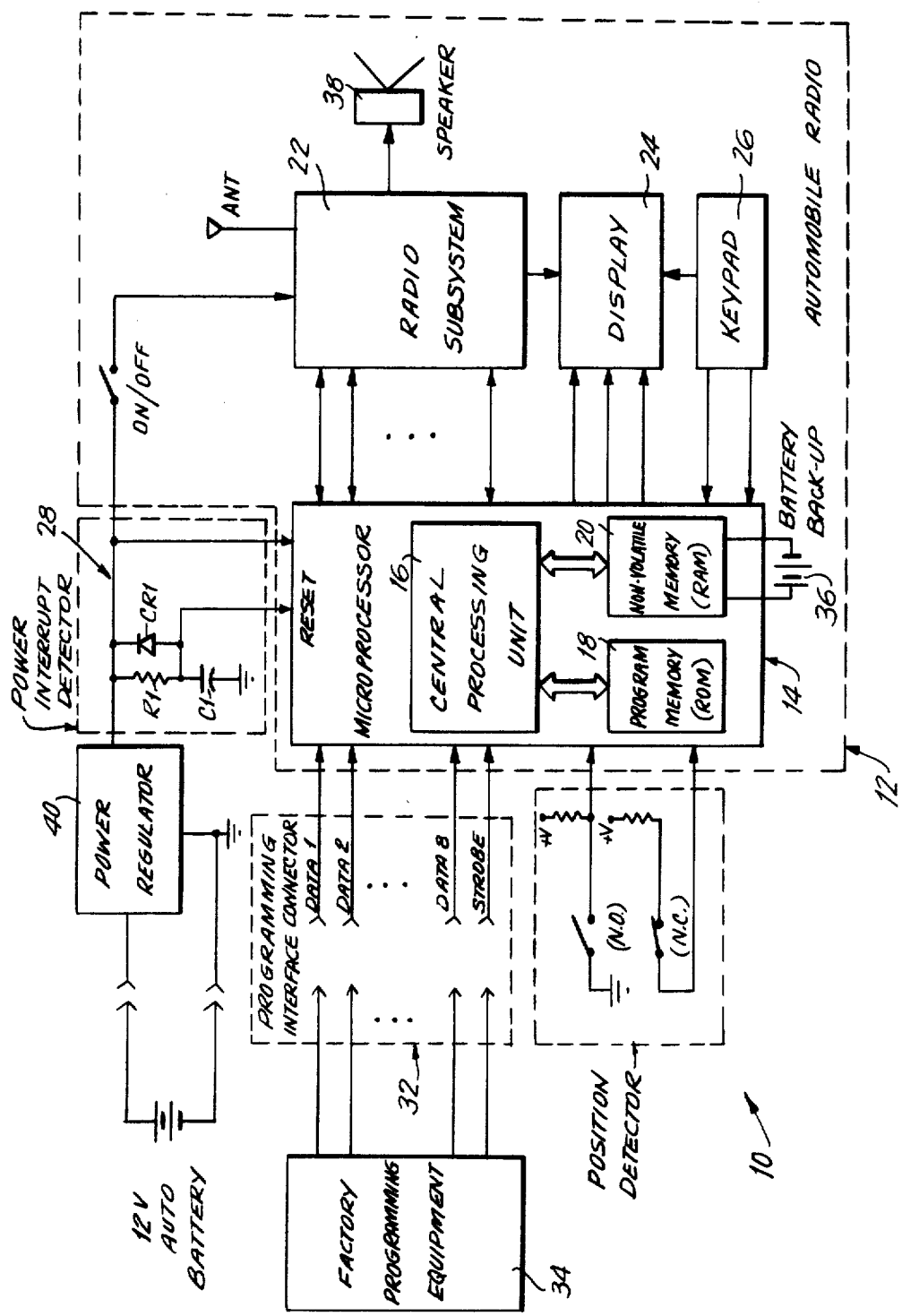
FIG. 1 is an electronic schematic block diagram depicting a security arrangement in accordance with one embodiment of the invention.

Referring now to the drawings, FIG. 1 depicts a security arrangement 10 for rendering a piece of electronic equipment, e.g. an automobile radio 12, inoperative after the occurrence of a disabling event, e.g. a theft event wherein the car radio is physically removed from its normal installed location in an automobile, and/or electrically removed from its source of electrical power, i.e. a 12-volt automobile battery. Although the following description of the invention is outlined in connection with an automobile radio, this invention is not intended to be so limited. It will be expressively understood that any piece of electronic equipment located in any type of environment is within the spirit of this invention. By way of non-limiting example, the security arrangement can be used to protect such diverse electronic equipment as a television set, a video cassette recorder, a computer terminal, a stereo system, a typewriter, etc., any of which can be located in such diverse environments as an automobile, a home, an office, a hotel, a boat, etc.

It is preferable if the radio 12 has a built-in microprocessor 14 which controls all or some of the control functions for controlling the normal operation of the radio. For example, the microprocessor 14 may be used to control the desired radio station frequency or any other normal radio function without which the radio would be essentially useless for its normal operation. However, the microprocessor 14 can be an additional device dedicated to controlling the security of the radio.

The microprocessor 14 is a single integrated circuit chip having a central processing unit (CPU) 16, a read only memory (ROM) 18, a non-volatile read/write internal random access memory (RAM) 20, and input/output terminals for connection to such external devices as a radio subsystem 22, a display 24, a keypad 26, a power interrupt detector circuit 28, a position detector circuit 30, and a programming interface connector 32 to which factory programming equipment 34 is connected.

All major components of the microprocessor are internal and self-contained. The microprocessor 14 is programmed to execute a program having an operational routine for controlling the normal operation of the radio, and a security routine for controlling the security of the radio, i.e. the theft-resisting function. The program is permanently stored in ROM 18. The CPU is the sole source of access to the ROM 18 and to the RAM 20 in which data is stored. External interrogation of any data stored in the ROM 18 or the RAM 20 is impossible. A CMOS microprocessor like the industry standard Model No. 80C48 can be used with a battery back-up circuit 36 to provide non-volatile memory storage so that the data stored in the RAM 20 will remain intact even after power to the radio has been removed. A standard lithium battery can retain data in such a memory for several years. A rechargeable battery will retain data after power removal, and will recharge during normal powered operation.

Newer single chip EEROM microprocessors, e.g. Seeq, Inc. Model No. 72720, contain an internal non-volatile memory which does not need a battery back-up circuit to maintain the integrity of stored data. In addition, the Seeq microprocessor inhibits external access to the data stored in its non-volatile memory, thus preventing interrogation or duplication of the device. Other examples of devices having non-volatile memories are NOVRAMs, EAROMs, EEPROMs, EPROMs, etc.

As explained in detail below in connection with FIGS. 2–4, the microprocessor is programmed as part of its security routine for distinguishing between a successful initial execution of the program and a subsequent execution thereof. During the initial program execution, the microprocessor is conditioned to accept a code for storage and to store the code in the RAM 20. In accordance with a first embodiment shown in FIG. 1, the microprocessor is conditioned by connecting the factory programming equipment 34 to the microprocessor via the programming interface connector 32. The factory programming equipment 34 inputs a factory initialization code signal which, in one preferred embodiment, is a predetermined number of eightbit data bytes synchronized to a strobe line. The microprocessor stores each data byte. If the correct factory initialization code signal was stored, then the microprocessor is operative for enabling the radio sybsystem 22 to become functional.

If it is desired that the radio owner be able to select his own unique private access code known only to him, then the factory initialization code signal is used to condition the microprocessor to accept a common public code for storage and to temporarily store this common public code in the RAM 20. In a given production run for a multitude of microprocessors, the manufacturer of the integrated circuit applies the same initialization code signal to each microprocessor so that the common public code is the same for all future equipment owners. Once the radio is installed, the owner may enter this known public code via the keypad 26 to the microprocessor, and thereupon the user may enter his own personally selected private access code via the keypad. This entered private access code overwrites the stored common public code and is stored in the RAM 20. The user, at his option and at any time, may change the private access code by entering the old private access code via the keypad, followed by a new private access code which then overwrites the previous one.

If it is desired that the access code be fixed and unchangeable by the owner, then the public code can be dispensed with, and a private code can be directly entered at the factory. In this case, the factory programming equipment 34 is operative to apply a different factory initialization code signal to each microprocessor in a production run so that each microprocessor has a unique, different private access code. This can be done, for example, by changing the content of the data bytes. An identification tag or the like must be issued by the factory to each owner to identify the individual private access code for each radio in this latter initialization technique.

In either of the two aforementioned initialization techniques, a private access code is eventually stored in the RAM 20 and, after such storage, the microprocessor is programmed to execute the operational routine, i.e. to render the radio operative and to maintain the radio normally operational until the occurrence of the disabling event. For example, the desired station frequency may be entered via the keypad 26, and the microprocessor is programmed to interpret the key strokes, to display the entered station frequency on the display 24 and to activate the appropriate tuner control lines of the radio subsystem 22 to tune in the desired station, and to broadcast the station signal over a radio speaker 38. Detector means, e.g. power interrupt detector circuit 28 and/or position detector circuit 30, are operatively associated with the microprocessor 14 for detecting the occurrence of the disabling event.

As shown in FIG. 1, when the radio 12 is initially installed in an automobile, power from the 12-volt battery is simultaneously applied through a power regulator circuit 40 to the power interrupt detector circuit 28 comprised of a resistor $R_1$, a capacitor $C_1$ and a device $CR_1$, and the microprocessor 14. The capacitor $C_1$ is initially discharged. Upon the application of power, the microprocessor begins functioning almost immediately. However, because its RESET line is connected to the capacitor $C_1$ which is initially at zero volts, i.e. at a logic zero, the microprocessor 14 is programmed to enter its reset mode. The capacitor $C_1$ begins to charge with a time constant determined by $R_1$ and $C_1$. The time constant is chosen to allow sufficient time for the microprocessor to reset. When the capacitor $C_1$ charges to a value exceeding a predetermined threshold voltage, i.e. a logic 1 value, the microprocessor begins executing its program from the beginning, which starts with the aforementioned security routine that requires entry of the proper private access code. Hence, after any interruption of power, for example due to theft, the microprocessor is reset and is caused to execute its security routine which is operative to disable the equipment from normal operation, and to maintain the equipment disabled even after the theft event has been discontinued, for example by installing the radio in the same or in a different automobile. The radio subsystem become activated only after the private access code is entered via the keypad 26. The microprocessor is programmed to compare the code entered via the keypad during the subsequent program execution to the stored private access code and, upon a successful match, the radio is restored to normal operation.

The position detector circuit 30 can be of any number of standard alarm-type, normally-open or normally-closed switches which will sense the removal of the radio from its normal installation. When one or more switches are activated, even if power is not removed, the microprocessor will halt execution of the operational routine and will cause the security routine to begin, which, as described above, requires entry of the proper private access code. The theft event can be recorded in the RAM 20 for possible later use.

Since the microprocessor is an integral part of the operational equipment, it is impossible to by-pass it. The only means available to advance the program to its operational routine is by a correct code entry. Replacing the microprocessor with another is not feasible because it can be made a proprietary device obtainable only from the original equipment manufacturer.

The factory initialization code signal must be kept secure from public knowledge, since it can compromise the security of the private access code. In other words, a thief who has knowledge of the factory initialization code signal can apply said signal to the microprocessor and condition the same to accept and store the common public code. However, since the factory initialization code signal need be entered only at the factory, it can be done on an automated basis at a locked, secure test station. The code itself can then be made long and complex to ensure adequate security. For example, the code can be comprised of five data bytes of eight bits each, with a minimum delay between bytes of one second. Normally, factory programming would take less than five seconds, but it would take $2^{40}$ seconds to try every possible combination of data. To foil guessing of the factory code by trial-and-error techniques, the microprocessor could be programmed with built-in time-outs to cause it to ignore codes for a given time duration after an erroneous code entry.

The keypad 26 will typically consist of one or more momentary push-button, rotary or slide switches which are depressed in a predetermined sequence, and/or for a predetermined sequence of time durations. Upon an unsuccessful code entry, a time delay circuit will cause the microprocessor to ignore additional code entry attempts for a predetermined time duration. This will discourage attempts at guessing the private access code.

Due to the internal storage of the private access code in the RAM 20, the private access code cannot be determined by physical examination of the internal components of the radio. Hence, the radio cannot be made operative by removing, bypassing, replacing or modifying any components therein.

Figure 2:
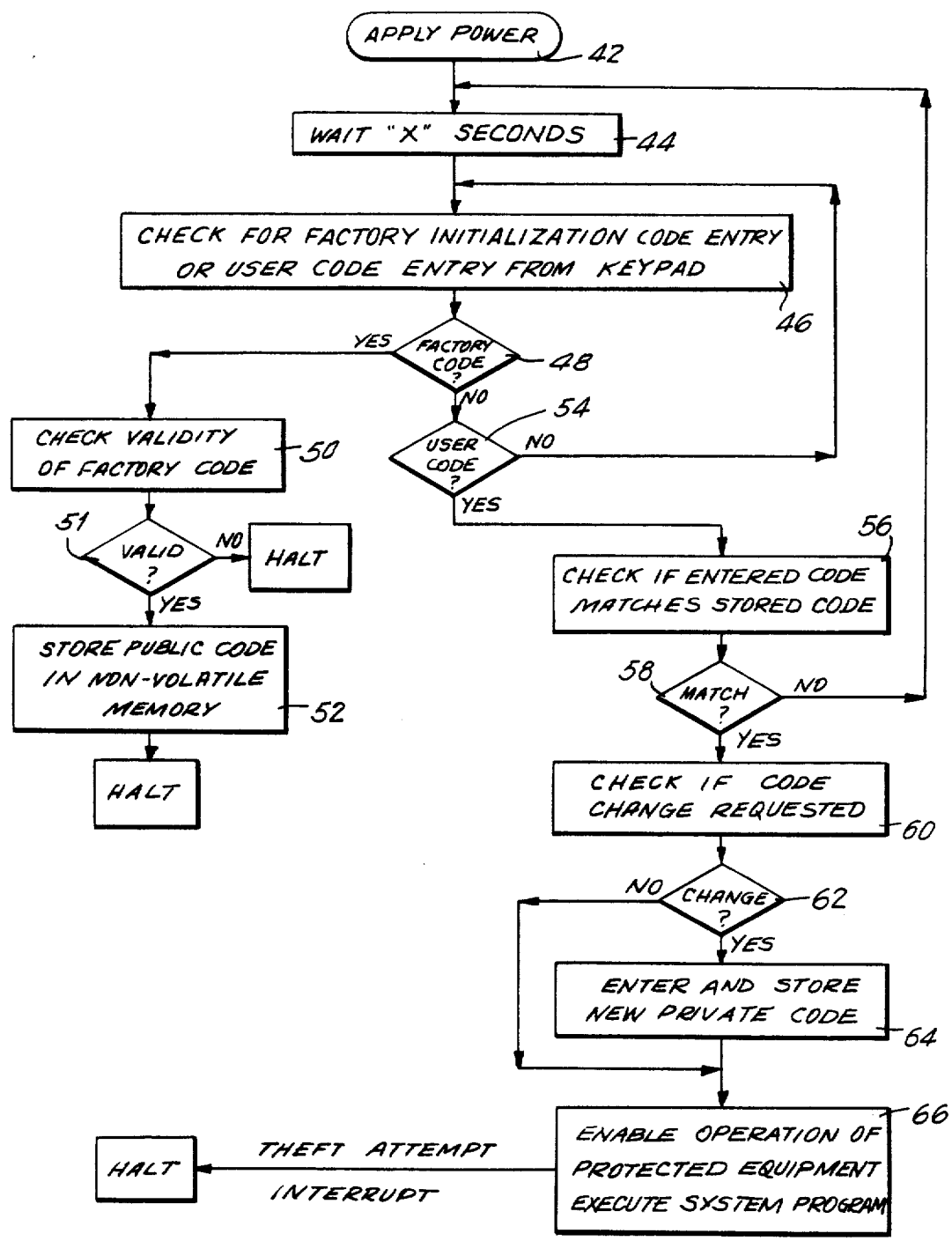
FIG. 2 is a program flow chart depicting the operation of the security arrangement in accordance with the embodiment of FIG. 1.

The security routine for the arrangement of FIG. 1 is shown in the flow chart of FIG. 2. Thus, after the application of power to the microprocessor (block 42), the microprocessor is programmed to wait for a predetermined waiting period (block 44), and thereupon to check, as shown in block 46, whether the factory initialization code signal is being inputted via the interface connector 32, or whether a code is being manually entered from the keypad 26. If a factory code signal has been entered (block 48), then its validity is checked at block 50. If the factory code signal is valid, as determined at block 51, then the microprocessor is programmed to store (block 52) a common public code in the RAM 20. The aforementioned sequence of events occurs during the initial program execution, i.e. the first time that power has been applied to the microprocessor.

On the other hand, if a code has been entered (block 54) from the keypad, then the microprocessor is programmed to check (block 56) if the entered code matches the stored code. If no match has occurred, as determined at block 58, then it is assumed that a thief is at work, and the microprocessor is programmed to return to block 44 and wait for a predetermined waiting time to discourage the thief from making another code entry attempt. If a match has occurred, as determined by block 58, then the microprocessor checks (block 60) to see if a code change has indeed been requested. If a change has been requested (block 62), then a code entry routine is initiated (block 64) to enter and store a new private code. If a code change has not been requested, or if a new private code has already been stored, then the microprocessor enables the radio to execute its normal operational routine and to function in its intended fashion, as depicted by block 66.

The factory initialization code signal technique shown in FIG. 2 is used solely to allow for storage of the public code. Since the public code is temporarily stored in a non-volatile memory, the factory initialization code signal need only be used once in initializing the arrangement. If it were possible to permanently record the fact that the public code had already been stored, then the factory initialization code signal would not be necessary at all to ensure the security of the arrangement. This is not feasible in an arrangement where the data stored in the RAM 20 can be readily erased by removal or disconnection of the back-up battery circuit 36.

However, in an arrangement which uses an inaccessible passive non-volatile data memory which does not use a battery back-up circuit, e.g. a self-adaptive EE-ROM, the factory initialization code technique can be eliminated. The microprocessor can then, instead, detect whether the public code has been initialized by examining its memory in either of the ways depicted in the flow charts of FIGS. 3 and 4.

Figure 3:
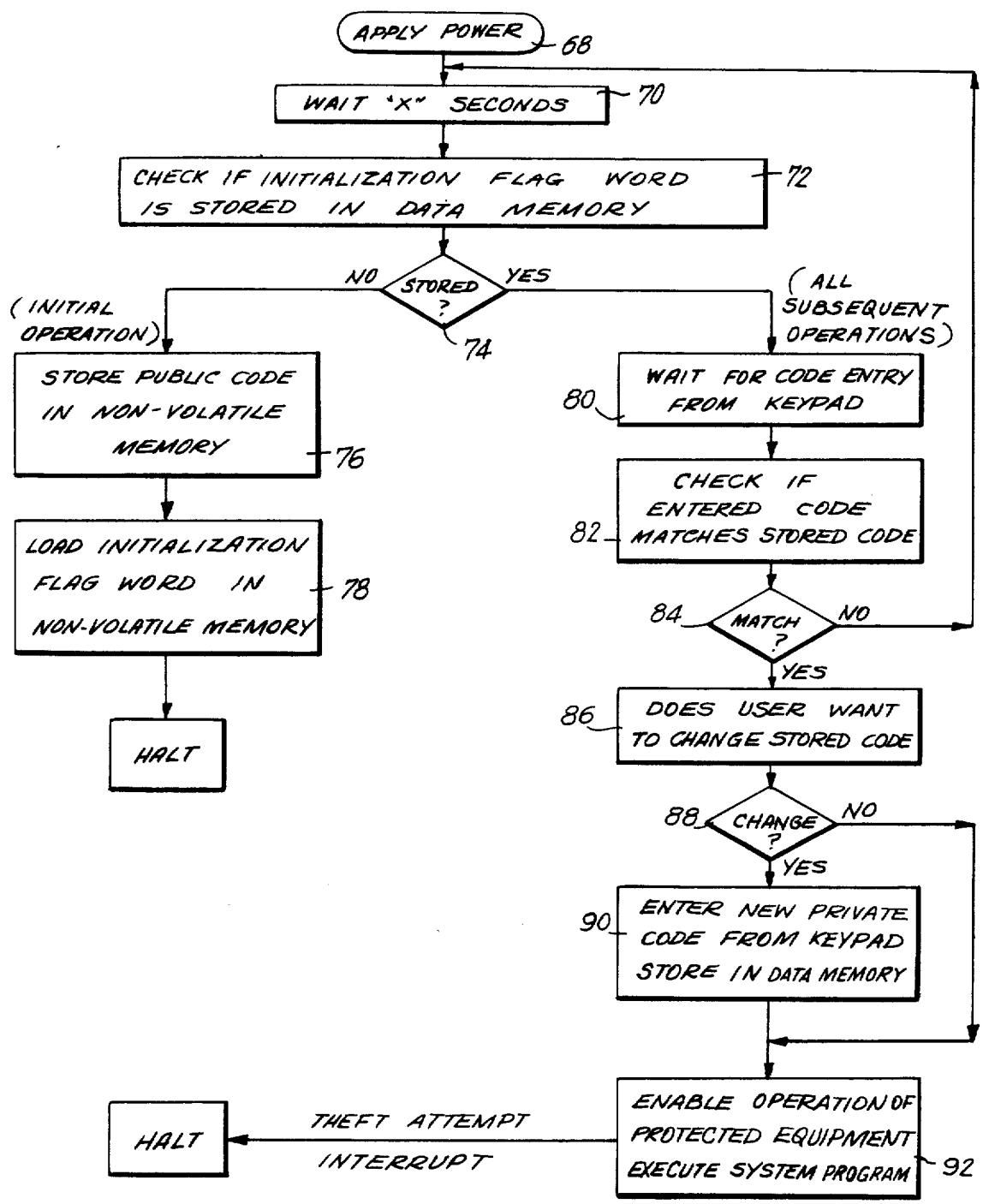
FIG. 3 is a program flow chart depicting the operation of the security arrangement in accordance with a second embodiment of the present invention.

Turning to FIG. 3, upon the application of power (block 68), the microprocessor again waits for a predetermined waiting period (block 70), and then begins program execution by checking (block 72) a predetermined location in its non-volatile data memory for a unique predetermined initialization flag word. If the microprocessor has never before executed its program, only random bits which would not match the pattern expected by the program would be read at this memory location. A non-match, as determined at block 74, would cause the microprocessor to condition itself to accept and to temporarily store the public code in the RAM 20, as depicted by block 76, as well as to permanently load the flag into its proper location in the RAM 20, as depicted by block 78. The aforementioned sequence of events occurs during the initial program execution of the microprocessor.

Now that the flag is permanently stored in the RAM 20, as determined by block 74, whenever the microprocessor is restarted, it will find that the already-stored flag matches the data it expects. Instead of routing to the public code storage routine, it will route itself to a code entry routine. The code entry routine includes the steps of waiting for the entry of a code from the keypad 26 (block 80), and checking if the entered code matches the stored code (block 82). If the entered code does not match the stored code, as determined by block 84, then, as before, it is assumed that a thief is at work, and the microprocessor is programmed to return to block 70. However, if a match has occurred, then the microprocessor checks to see if the user wants to change the stored code (block 86). If a code changer has been requested, as determined by block 88, then the microprocessor enters and stores the new private code (block 90). If a code change has not been requested, or if the new private code has already been stored, then the microprocessor enables the radio to execute its normal operational routine and to function in its regular fashion, as depicted by block 92.

Figure 4:
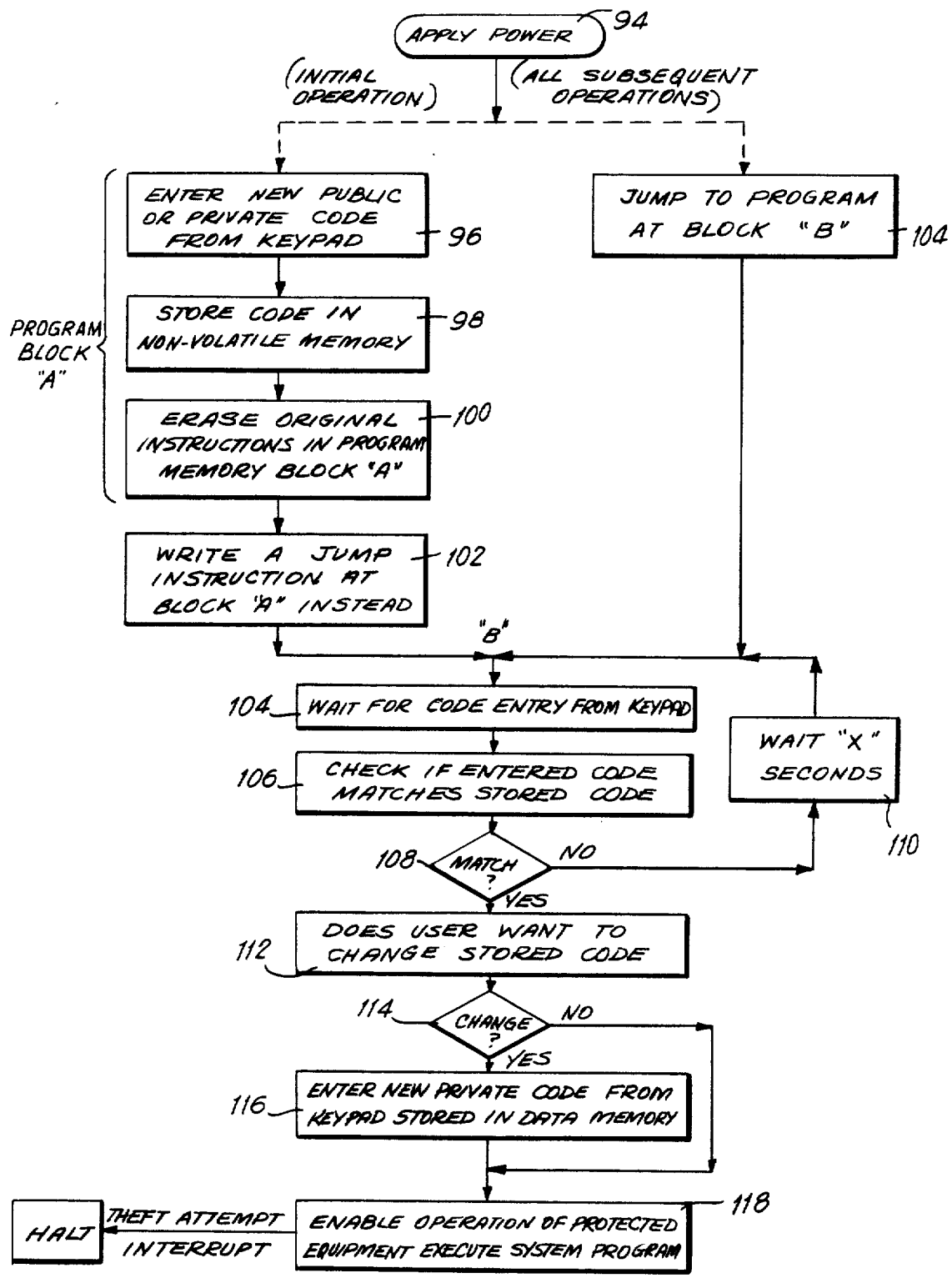
FIG. 4 is a program flow chart depicting the operation of the security arrangement in accordance with a third embodiment of the present invention.

Turning now to FIG. 4, upon the application of power (block 94), the microprocessor is programmed to execute a code entry routine, i.e. program block A. This code entry routine conditions the microprocessor to enter a new public or private code directly from the keypad, as depicted at block 96, and to store the entered code in the RAM 20, as depicted by block 98. In addition, the program block A includes the erasure of all its original instructions upon the completion of the initial program execution, as depicted by block 100. After the erasure, a jump instruction is added, as depicted by blocks 102 and 104, wherein the microprocessor is programmed to skip over what was program block A upon each and every subsequent program execution to block B. This self-adaptive capability, i.e. wherein the microprocessor program can modify itself during execution, can be used to cause the microprocessor to execute a routine once, then erase the program code entry routine just executed and substitute a different instruction. The change becomes permanent since the program memory is non-volatile and externally inaccessible.

Upon each and every subsequent program execution, the microprocessor is programmed to wait for a code entry from the keypad (block 104), and thereupon to check (block 106) if the entered code matches the previously stored code. If a match is not made (block 108), then it is assumed that a thief is at work, and the microprocessor is programmed to go to block 110 which introduces a waiting period sufficient in duration to discourage a thief. If a match has occurred at block 108, then the microprocessor checks to see whether the user wishes to change the stored code (block 112). If a code change has been requested (block 114), then the microprocessor is conditioned to accept and to store a new private code entered from the keypad, as depicted in block 116. If a code change has not been requested, or if the new private code has already been stored in the RAM 20, then the microprocessor enables the radio to execute its normal operational routine and to function in a regular fashion, as depicted in block 118.

It will be understood that each of the elements described above, or two or more together, may also find a useful application in other types of arrangements differing from the type described above.

While the invention has been illustrated and described as embodied in a security arrangement for and method of rendering a microprocessor-controlled radio inoperative after occurrence of a disabling event, it is not intended to be limited to the details shown, since various modifications and structural changes may be made without departing in any way from the spirit of the present invention.

The microprocessor is preferably constituted as a single integrated chip but, in some cases, could be constituted on more than one chip. If more than one chip is utilized, then it is preferable if the chips are mounted in a single package or housing.

The term "microprocessor" as used throughout this specification and in the following claims is not intended to be limited solely to a programmable integrated circuit device, but is specifically intended to also cover dedicated integrated circuit devices which perform the same functions described herein.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A lock-out security arrangment for rendering electronic equipment having a normal operation inoperative after a disabling event has occurred, and for maintaining the equipment inoperative after the disabling event has terminated, comprising:
    (a) a microprocessor having an internal, non-volatile, protected memory accessed solely by the microprocessor and protected from interrogation external to the microprocessor, said microprocessor being operative for executing a program stored in the internal memory, said program having an operational routine for controlling the normal operation of the equipment, and a security routine for controlling the security of the equipment;
    (b) said security routine having means for distinguishing between an initial execution of the security routine and a subsequent execution of the security routine;
    (c) means responsive to the initial execution of the security routine, for storing a first code in a secured manner in the internal memory of the microprocessor such that the stored first code is protected from interrogation external to the microprocessor;
    (d) code entry means operatively connected to the microprocessor, for entering a second code to the microprocessor;
    (e) said security routine having code validity means for comparing the second code entered using the code entry means to the stored first code whose identity is protected from external interrogation;
    (f) enabling means responsive to a completed initial execution, or to the subsequent execution, of the security routine, for enabling the microprocessor to execute the operational routine after the first code has been stored in the internal memory of the microprocessor, and for maintaining the equipment normally operational until the disabling event has occurred;
    (g) detector means operatively connected to the microprocessor, for detecting when the disabling event has occurred; and
    (h) disabling means responsive to the detector means and operatively connected to the microprocessor, for disabling the equipment from normal operation after the disabling event has occurred, said disabling means being further operative for maintaining the equipment disabled, even after the disabling even has terminated, until the second code matches the stored first code.

2. The security arrangement as recited in claim 1, wherein the microprocessor includes an integrated circuit chip in a self-contained housing built into the equipment, said chip having a central processing unit, and said internal memory including a read-only memory in which the program is permanently stored and a read/write random access memory in which the first code is stored; and wherein the central processing unit, the read-only memory and the random access memory are all self-contained within the housing to protect the program and the stored first code from both visual and electronic examination.

3. The security arrangement as recited in claim 1, wherein a plurality of microprocessors are to be used for protecting a corresponding plurality of electronic equipment, and wherein the stored first code is different and unique for each microprocessor.

4. The security arrangement as recited in claim 3, wherein the storing means includes programming means for directing each microprocessor in response to the initial execution of the security routine to accept the different stored first code and to store the latter in the internal memory, said programming means being operative for applying a code signal to each microprocessor, each code signal being different for each microprocessor.

5. The security arrangement as recited in claim 3, wherein the storing means includes programming means for directing each microprocessor in response to the initial execution of the security routine to accept a common public code for storage and to temporarily store the common public code in the internal memory, said programming means being operative for applying an identical code signal to each microprocessor; and wherein the security routine associated with each microprocessor is operative for changing the common public code to each different first code upon entry of the latter by the respectively associated code entry means.

6. The security arrangement as recited in claim 5, wherein each code entry means is manually actuatable by each user, and wherein each different first code is selected and manually entered by each user to ensure code privacy.

7. The security arrangement as recited in claim 6, wherein the security routine of each microprocessor includes means for changing the first code selected by a user to a different private code selected by the user.

8. The security arrangement as recited in claim 3, wherein the distinguishing means associated with each microprocessor includes means for permanently loading a flag in a predetermined location in the internal memory of each microprocessor in response to the initial execution of the security routine, and wherein the storing means associated with each microprocessor is operative for directing each microprocessor when the flag is not loaded in the predetermined memory location to accept a common public code for storage and to temporarily store the common public code in the internal memory, and wherein the security routine associated with each microprocessor is operative after the flag has been loaded in the predetermined memory location to change the common public code to each different first code upon entry of the latter by the respectively associated code entry means.

9. The security arrangement as recited in claim 3, wherein the security routine associated with each microprocessor includes means for programming the microprocessor with a code entry routine, and means for erasing the code entry routine in response to the initial execution of the security routine; and wherein the storing means associated with each microprocessor is operative for directing each microprocessor when the code entry routine is not erased to accept a code for storage and to store the code in the internal memory; and wherein the code validity means associated with each microprocessor is operative after the code entry routine has been erased for comparing the second code entered by the code entry means to the first code stored in the protected memory.

10. The security arrangement as recited in claim 9, wherein each storing means directs the associated microprocessor when the code entry routine is not erased to accept a common public code for storage and to temporarily store the common public code in the internal memory, and wherein the security routine of each microprocessor is operative after the code entry routine has been erased to change the common public code to each different first code upon entry of the latter by the respectively associated code entry means.

11. The security arrangement as recited in claim 1, and further comprising user-operated means for changing the first code to a different user-selected private code by user operation of the code entry means.

12. The security arrangement as recited in claim 1, wherein the disabling event is a theft event, and the detector means is operative for detecting the removal of the equipment from its source of electrical power.

13. The security arrangement as recited in claim 12, wherein the protected memory remains non-volatile, even after removal of the electrical power source, by being connected to a battery back-up circuit.

14. The security arrangement as recited in claim 12, wherein the protected memory remains non-volatile, even after removal of the electrical power source, by constituting the protected memory as an EEPROM circuit.

15. The security arrangement as recited in claim 1, wherein the disabling means includes a time delay means for introducing a waiting period when the second code does not match the stored first code, said code validity means being inoperative until the waiting period has expired.

16. The security arrangement as recited in claim 1, wherein the disabling event is a theft event, and the detector means is operative for detecting the removal of the equipment from its authorized location.

17. A lock-out security arrangement for rendering electronic equipment having a normal operation inoperative after a disabling event has occurred, and for maintaining the equipment inoperative after the disabling event has terminated, comprising:
(a) a microprocessor having an internal, non-volatile, protected memory accessed solely by the microprocessor and protected from interrogation external to the microprocessor, said microprocessor being operative for executing a program stored in the internal memory, said program having an operational routine for controlling the normal operation of the equipment, and a security routine for controlling the security of the equipment;
(b) said security routine having means for distinguishing between an initial execution of the security routine and a subsequent execution of the security routine;
(c) means responsive to the initial execution of the security routine, for storing a public code in the internal memory of the microprocessor;
(d) means for substituting a private code for the public code in a secured manner in the internal memory of the microprocessor such that the stored private code is protected from interrogation external to the microprocessor;
(e) code entry means operatively connected to the microprocessor, for entering a trial code to the microprocessor;
(f) said security routine having code validity means for comparing the trial code entered using the code entry means to the stored private code whose identity is protected from external interrogation;
(g) enabling means responsive to a completed initial execution, or to the subsequent execution, of the security routine, for enabling the microprocessor to execute the operational routine after the private code has been stored in the internal memory of the microprocessor, and for maintaining the equipment normally operational until the disabling event has occurred;
(h) detector means operatively connected to the microprocessor, for detecting when the disabling event has occurred; and
(i) disabling means responsive to the detector means and operatively connected to the microprocessor, for disabling the equipment from normal operation after the disabling event has occurred, said disabling means being further operative for maintaining the equipment disabled, even after the disabling event has terminated, until the trial code matches the stored private code.

18. A lock-out security arrangement for rendering electronic equipment having a normal operation inoperative after a disabling event has occurred, and for maintaining the equipment inoperative after the disabling event has terminated, comprising:
(a) a microprocessor having an internal, non-volatile, protected memory accessed solely by the microprocessor and protected from interrogation external to the microprocessor, said microprocessor being operative for executing a program stored in the internal memory, said program having an operational routine for controlling the normal operation of the equipment, and a security routine for controlling the security of the equipment;

(b) said security routine having means for distinguishing between an initial execution of the security routine and a subsequent execution of the security routine;

(c) means responsive to the initial execution of the security routine, for storing a public code in the internal memory of the microprocessor;

(d) means for substituting a first private code for the public code in a secured manner in the internal memory of the microprocessor such that the stored first private code is protected from interrogation external to the microprocessor;

(e) code entry means operatively connected to the microprocessor, for entering a trial code to the microprocessor;

(f) said security routine having code validity means for comparing the trial code entered using the code entry means to the stored first private code whose identity is protected from external interrogation;

(g) enabling means responsive to a completed initial execution, or to the subsequent execution, of the security routine, for enabling the microprocessor to execute the operational routine after the first private code has been stored in the internal memory of the microprocessor, and for maintaining the equipment normally operational until the disabling event has occurred;

(h) detector means operatively connected to the microprocessor, for detecting when the disabling event has occurred;

(i) disabling means responsive to the detector means and operatively connected to the microprocessor, for disabling the equipment from normal operation after the disabling event has occurred, said disabling means being further operative for maintaining the equipment disabled, even after the disabling event has terminated, until the trial code matches the stored first private code;

(j) means for changing the first private code to a second private code known only to an authorized user having knowledge of the first private code, and for storing the second private code in a secured manner in the internal memory of the microprocessor such that the stored second private code is protected from interrogation external to the microprocessor;

(k) said code validity means being further operative, after the second private code has been stored, for comparing the trial code entered using the code entry means to the stored second private code whose identity is protected from external interrogation; and (l) said disabling means being still further operative for maintaining the equipment disabled, even after the disabling event has terminated, until the trial code matches the stored second private code.

19. A method of rendering electronic equipment having a normal operation inoperative after a disabling event has occurred, and for maintaining the equipment inoperative after the disabling event has occurred, comprising the steps of:

(a) programming a microprocessor having an internal, non-volatile, protected memory for executing a program stored in the internal memory, said program having an operational routine for controlling the normal operation of the equipment, and a security routine for controlling the security of the equipment;

(b) accessing the internal memory of the microprocessor solely by the microprocessor, and protecting the internal memory from interrogation external to the microprocessor;

(c) distinguishing between an initial execution of the security routine and a subsequent execution of the security routine;

(d) storing in response to the initial execution of the security routine a first code in a secured manner in the internal memory of the microprocessor such that the stored first code is protected from interrogation external to the microprocessor;

(e) entering a second code to the microprocessor;

(f) comparing the entered second code to the stored first code whose identity is protected from external interrogation;

(g) enabling the microprocessor in response to a completed initial execution, or to the subsequent execution, of the security routine, to execute the operational routine after the first code has been stored in the internal memory of the microprocessor, and maintaining the equipment normally operational until the disabling event has occurred;

(h) detecting when the disabling event has occurred;

(i) disabling the equipment from normal operation after the disabling event has occurred; and (j) maintaining the equipment disabled, even after the disabling event has terminated, until the entered second code matches the stored first code.

20. The method as recited in claim 19, and further comprising the step of providing a plurality of microprocessors for protecting a corresponding plurality of electronic equipment, and wherein the storing step is performed by storing the first code as different and unique for each microprocessor in the internal memory thereof.

21. The method as recited in claim 20, wherein the storing step is performed by directing each microprocessor in response to the initial execution of the security routine to accept the different first code and to stored the latter in the internal memory, said storing step being performed by applying a code signal to each microprocessor, each code signal being different for each microprocessor.

22. The method as recited in claim 20, wherein the storing step is performed by directing each microprocessor in response to the initial execution of the security routine to accept a common public code for storage and to temporarily store the common public code in the internal memory, said storing step being performed by applying an identical code signal to each microprocessor; and further including the step of changing the common public code to each different first code upon entry of the latter during the code entering step.

23. The method as recited in claim 22, wherein the code entering step is manually performed by each user, who selects and manually enters each different first code to ensure code privacy.

24. The method as recited in claim 17, and further comprising the step of changing the first code selected by the user to a different private code selected by the user.

25. The method as recited in claim 20, wherein the distinguishing step is performed by permanently loading a flag in a predetermined location in the internal memory of each microprocessor after the initial execution of the security routine, and wherein the storing step is performed by directing each microprocessor when the flag is not loaded in the predetermined memory location to accept a common public code for storage and to temporarily store the common public code in the internal memory, and wherein the storing step is performed after the respective flag has been loaded in the predetermined memory location by changing the common public code to each different first code upon entry of the latter during the code entering step.

26. The method as recited in claim 20, wherein the distinguishing step includes the step of programming each microprocessor with a code entry routine, and the step of erasing the code entry routine after the initial execution of the security routine; and wherein the storing step is performed by directing each microprocessor when the code entry routine is not erased to accept a code for storage and to store the code in the internal memory, and wherein the comparing step is performed after the code entry routine has been erased for comparing a code entered during the code entering step to the code stored in the protected memory.

27. The method as recited in claim 26, wherein the storing step is performed when the code entry routine is not erased to accept a common public code for storage and to temporarily store the common public code in the protected memory, and wherein the storing step is performed after the code entry routine has been erased to change the common public code to each different first code upon entry of the latter during the code entering step.

28. The method as recited in claim 19, and further comprising the step of changing the first code to a different private code selected by user entry.

29. The method as recited in claim 19, wherein the detecting step is performed by detecting the removal of the equipment from its source of electrical power.

30. The method as recited in claim 19, wherein the disabling step is performed by introducing a waiting period when the first entered during the code entering step does not match the stored first code, said comparing step being inoperative until the waiting period has expired.

31. The method as recited in claim 19, wherein the detecting step is performed by detecting the removal of the equipment from its authorized location.

* * * * *

REEXAMINATION CERTIFICATE (3022th)

United States Patent [19]
Kaish et al.

[11] B1 4,494,114
[45] Certificate Issued   Oct. 15, 1996

[54] SECURITY ARRANGEMENT FOR AND METHOD OF RENDERING MICROPROCESSOR-CONTROLLED ELECTRONIC EQUIPMENT INOPERATIVE AFTER OCCURRENCE OF DISABLING EVENT

[75] Inventors: Norman Kaish, Whitestone; David Durst, Syosset, both of N.Y.

[73] Assignee: International Electronic Technology Corporation, Far Rockaway, N.Y.

Reexamination Request:
No. 90/004,162, Feb. 26, 1996

Reexamination Certificate for:
Patent No.: 4,494,114
Issued: Jan. 15, 1985
Appl. No.: 558,115
Filed: Dec. 5, 1983

[51] Int. Cl.⁶ ............................................... G08B 13/22
[52] U.S. Cl. ........................ 340/825.31; 340/63; 340/571
[58] Field of Search ........................... 340/825.31, 571, 340/572

[56]  References Cited

U.S. PATENT DOCUMENTS

| | | |
|---|---|---|
| 2,843,843 | 7/1958 | Davis . |
| 3,233,227 | 2/1966 | Petschauer . |
| 3,637,994 | 1/1972 | Ellingboe . |
| 3,641,316 | 2/1972 | Dethloff et al. . |
| 3,641,498 | 2/1972 | Hedin . |
| 3,656,115 | 4/1972 | Hesselgren ................. 340/825.32 |
| 3,702,464 | 11/1972 | Castrucci . |
| 3,754,214 | 8/1973 | Matsumoto et al. . |
| 3,761,892 | 9/1973 | Bosnyak et al. . |
| 3,815,088 | 6/1974 | Kumpgbeck . |
| 3,816,711 | 6/1974 | Bliss . |
| 3,859,634 | 1/1975 | Perron et al. . |
| 3,868,057 | 2/1975 | Chavez . |
| 3,873,892 | 3/1975 | Dettling et al. . |
| 3,876,865 | 4/1975 | Bliss . |
| 3,878,511 | 4/1975 | Wagner . |
| 3,908,417 | 9/1975 | Beudat . |
| 3,931,504 | 1/1976 | Jacoby . |

(List continued on next page.)

FOREIGN PATENT DOCUMENTS

| | | |
|---|---|---|
| 0062438A2 | 10/1982 | European Pat. Off. . |
| 0127258A3 | 12/1984 | European Pat. Off. . |
| 0141468A3 | 5/1985 | European Pat. Off. . |
| 2519832 | 7/1983 | France . |
| 3040465A1 | 6/1982 | Germany . |
| 3342003A1 | 6/1984 | Germany . |
| 3440379A1 | 5/1985 | Germany . |
| 2931988C2 | 10/1986 | Germany . |
| 1108031 | 3/1978 | Italy . |
| 2018482 | 10/1979 | United Kingdom . |

OTHER PUBLICATIONS

*Theft Protection For Typewriters*, J. I. Compton, IBM Technical Disclosure Bulletin, vol. 25, No. 4, Sep., 1982, pp. 1975–1977.

Brochure entitled: *Beschreibung und Anwendungsmoglichkeiten*; 1977; pp. 8, 9 & 22.

(List continued on next page.)

*Primary Examiner*—Brian Zimmerman

[57]  ABSTRACT

A lock-out security arrangement for and method of maintaining microprocessor-controlled electronic equipment normally operational until the occurrence of a disabling event, such as physical removal of the equipment from its normal installation, and/or electrical removal of the equipment from a source of electrical power, and thereupon for disabling the equipment after detecting the disabling event and for maintaining the equipment disabled even after the disabling event has been discontinued, until a code manually entered via a keyboard associated with a microprocessor for controlling the normal operation of the equipment matches a private access code whose identity is protected from external interrogation by reason of being stored in an internal non-volatile memory of the microprocessor. The private access code is preferably selected by and known only to the user, and may be changed to a different private access code at the user's option.

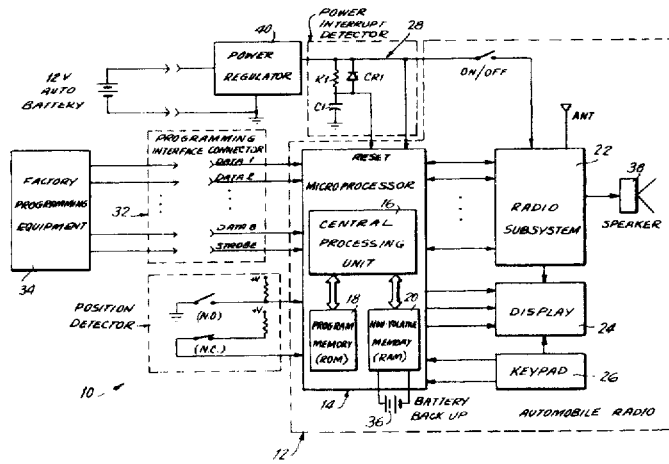

B1 4,494,114
Page 2

U.S. PATENT DOCUMENTS

| | | |
|---|---|---|
| 3,934,122 | 1/1976 | Riccitelli . |
| 3,971,916 | 7/1976 | Moreno . |
| 3,972,039 | 7/1976 | Marshall . |
| 3,979,052 | 9/1976 | Dettling et al. . |
| 3,980,844 | 9/1976 | Bianco . |
| 4,001,550 | 1/1977 | Schatz . |
| 4,004,133 | 1/1977 | Hannan et al. . |
| 4,007,355 | 2/1977 | Moreno . |
| 4,008,465 | 2/1977 | Le Doux . |
| 4,016,404 | 4/1977 | Appleton . |
| 4,050,063 | 9/1977 | Schull . |
| 4,070,882 | 1/1978 | Ruiz . |
| 4,079,605 | 3/1978 | Bartels . |
| 4,090,089 | 5/1978 | Morello ............... 340/825.32 |
| 4,092,524 | 5/1978 | Moreno . |
| 4,102,493 | 7/1978 | Moreno . |
| 4,103,289 | 7/1978 | Kolber ............... 340/825.32 |
| 4,105,156 | 8/1978 | Dethloff . |
| 4,120,452 | 10/1978 | Kimura et al. . |
| 4,139,864 | 2/1979 | Schulman . |
| 4,177,657 | 12/1979 | Aydin . |
| 4,179,064 | 12/1979 | Yoshioka et al. . |
| 4,184,148 | 1/1980 | Smagala-Romanoff . |
| 4,184,201 | 1/1980 | Melberg et al. . |
| 4,204,113 | 5/1980 | Giraud et al. . |
| 4,206,491 | 6/1980 | Ligman et al. . |
| 4,211,919 | 7/1980 | Ugon . |
| 4,213,118 | 7/1980 | Genest et al. . |
| 4,216,577 | 8/1980 | Badet et al. . |
| 4,222,516 | 9/1980 | Badet et al. . |
| 4,224,666 | 9/1980 | Giraud . |
| 4,232,291 | 11/1980 | Bernier . |
| 4,233,828 | 11/1980 | Dauenbaugh . |
| 4,256,955 | 3/1981 | Giraud et al. . |
| 4,262,337 | 4/1981 | Jones . |
| 4,267,578 | 5/1981 | Vetter . |
| 4,268,099 | 5/1981 | Clausen . |
| 4,271,482 | 6/1981 | Giraud . |
| 4,272,758 | 6/1981 | Giraud . |
| 4,274,080 | 6/1981 | Brunken . |
| 4,277,837 | 7/1981 | Stuckert . |
| 4,283,710 | 8/1981 | Genest et al. . |
| 4,284,982 | 4/1981 | Lent . |
| 4,284,984 | 8/1981 | Scarpino, III et al. . |
| 4,288,778 | 9/1981 | Zucker . |
| 4,300,130 | 11/1981 | Fotheringham et al. . |
| 4,322,854 | 3/1982 | Bundens et al. . |
| 4,337,462 | 6/1982 | Lemelson . |
| 4,353,064 | 10/1982 | Stamm ............... 340/825.31 |
| 4,361,756 | 11/1982 | Parmentier . |
| 4,365,240 | 12/1982 | Scarpino, III et al. . |
| 4,367,402 | 1/1983 | Giraud et al. . |
| 4,404,464 | 9/1983 | Moreno . |
| 4,408,119 | 10/1983 | Decavele . |
| 4,409,434 | 10/1983 | Basset et al. . |
| 4,409,471 | 10/1983 | Aigo . |
| 4,411,144 | 10/1983 | Aydin . |
| 4,412,216 | 10/1983 | Mole et al. ............... 340/825.31 |
| 4,417,413 | 11/1983 | Hoppe et al. . |
| 4,437,153 | 3/1984 | Kamiyama et al. ............... 340/825.31 |
| 4,438,431 | 3/1984 | Toyomura . |
| 4,471,343 | 9/1984 | Lemelson ............... 340/825.31 |
| 4,475,175 | 10/1984 | Smith . |
| 4,476,488 | 10/1984 | Merrell . |
| 4,477,799 | 10/1984 | Rocci et al. ............... 340/825.08 |
| 4,477,800 | 10/1984 | O'Brien ............... 340/825.08 |
| 4,477,806 | 10/1984 | Mochida et al. ............... 340/825.31 |
| 4,486,751 | 12/1984 | Mole et al. ............... 340/825.31 |
| 4,492,959 | 1/1985 | Mochida et al. . |
| 4,494,111 | 1/1985 | Rocci et al. ............... 340/825.31 |
| 4,499,462 | 2/1985 | Stoesser et al. ............... 340/825.31 |
| 4,512,453 | 4/1985 | Schuller et al. . |
| 4,521,852 | 6/1985 | Guttag . |
| 4,521,853 | 6/1985 | Guttag . |
| 4,534,056 | 8/1985 | Feilchenfeld et al. ............... 340/825.31 |
| 4,534,194 | 8/1985 | Aydin . |
| 4,553,127 | 11/1985 | Issa . |
| 4,570,466 | 2/1986 | Matthews . |
| 4,590,552 | 5/1986 | Guttag et al. . |
| 4,604,708 | 8/1986 | Lewis ............... 340/825.31 |
| 4,609,780 | 9/1986 | Clark ............... 340/825.31 |
| 4,623,920 | 11/1986 | Defresne et al. . |
| 4,663,621 | 5/1987 | Field et al. ............... 340/825.31 |
| 4,674,047 | 6/1987 | Tyler et al. . |
| 4,686,912 | 8/1987 | Fogleman et al. . |
| 4,690,240 | 9/1987 | Russo . |

OTHER PUBLICATIONS

Elektronik Lexikon, Dr. Walter Baier, Franckh'sche Verlagschandlung Stuttgart, p. 464; 1982.

Technical Marketing Information, *Programmschutz mit dem Einchip–Mikrocomputer MC68705P5*, pp. 2–4; G. Auderer; Motorola GmbH, 1982.

SGS Design Note, *Non Volatile Memory Technology*, Mar. 1981, DN 304.

Einfuhrung In Die Mikroprozessor Technik, Texas Instruments Deutschland GmbH, 1977, pp. 80–81, 86–87, 140–141, 152–153, 258–259, 262–263.

*The Mostek 3872. Double the ROM. Double the RAM.*, Electronics, vol. 51, No. 3, Feb. 2, 1978, p. 3.

*Compatibility cures growing pains of microcomputer family*, Electronics, vol. 51, No. 3, Michael Wiles, et al., Feb. 2, 1978, pp. 95–103.

*RAM, ROM, Single–chip microcomputer expands its memory*, Electronics, Harold W. Dozier and Robert S. Green, May 11, 1978, pp. 105–110.

Operating System Principles; 1973, Prentice Hall; Chapter 1, p. 16; Chapter 17, p. 226.

Operating Systems, *Donovan (All Access)*, *Madnick (Read)*, *Carpenter (Read)*, *All Others (No Access)*, 1974, McGraw–Hill.

*Integrationstechniken fur Mikroprozessoren*, Mikroprozessoren und ihre Anwendungen, Von Dr.-Ing. Karl Goser; 1977, pp. 162–163.

*Architektur von Mikroprozessoren*, Mikroprozessoren und ihre Anwendungen 2, 1979; pp. 40–47, 52, 68–69, 489, 493–494.

*Telepayment and Electronic Money the Smart Card*, Communication & Transmission No. 5, Dec. 1982, pp. 11–19.

*US Vanguard Visits France to Look at the Smart Card*; 1982 American Banker, Aug. 11, 1982.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–31 is confirmed.

* * * * *